No. 653,922. Patented July 17, 1900.
J. SEITER.
LUBRICATING DEVICE FOR AXLES.
(Application filed Apr. 25, 1900.)
(No Model.)
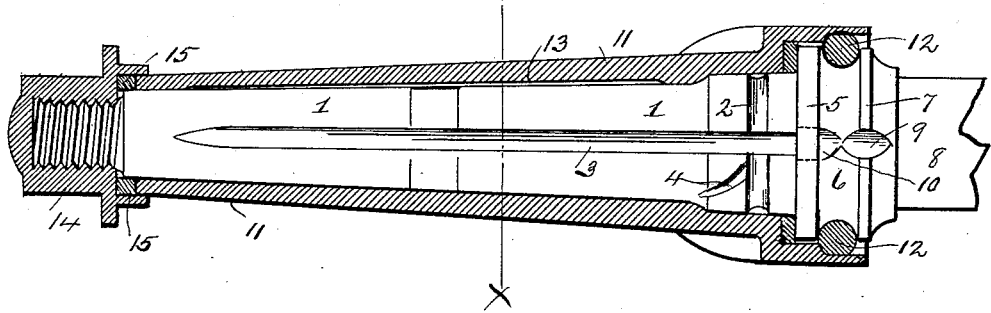
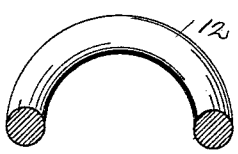
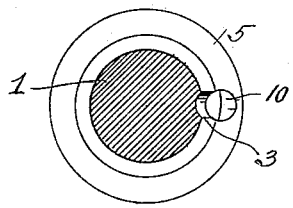
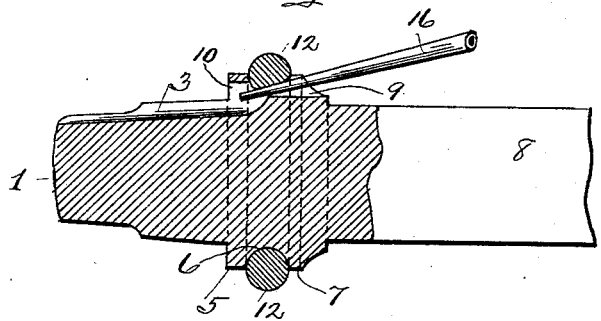
Witnesses:
M. E. Harrison
H. M. Levis
Inventor:
John Seiter.
O. D. Levis.
THE NORRIS PETERS CO., PHOTO-LITHO., WASHINGTON, D. C.

UNITED STATES PATENT OFFICE.

JOHN SEITER, OF EAST PALESTINE, OHIO, ASSIGNOR OF ONE-FOURTH TO WILLIAM H. HELMAN, OF SAME PLACE.

LUBRICATING DEVICE FOR AXLES.

SPECIFICATION forming part of Letters Patent No. 653,922, dated July 17, 1900.

Application filed April 25, 1900. Serial No. 14,291. (No model.)

*To all whom it may concern:*

Be it known that I, JOHN SEITER, a citizen of the United States of America, residing at East Palestine, in the county of Columbiana and State of Ohio, have invented certain new and useful Improvements in Lubricating Devices for Axles; and I do hereby declare the following to be a full, clear, and exact description thereof, reference being had to the accompanying drawings, which form a part of this specification.

My invention relates to an improved lubricating device for axles and other journals; and it consists in the certain details of construction and combination of parts, as will be fully described hereinafter.

In the accompanying drawings, Figure 1 is a side sectional elevation of an ordinary wagon-axle and box provided with my improved means for lubricating the same. Fig. 2 is an end sectional elevation of the axle, taken on the line X X of Fig. 1. Fig. 3 is a longitudinal sectional elevation taken through the rear portion of the axle, showing the soft-rubber band and the nozzle of an ordinary oil-can passed beneath the same. Fig. 4 is a sectional perspective view of the rubber band.

To construct a lubricating device in accordance with my invention, and thereby provide a means whereby axles and other journals may be lubricated and at the same time form an oil-tight and dust-proof box about the journal, I take the ordinary axle and box, such as are in general use on wagons and other vehicles, the same consisting of the axle or journal 1, provided at the one end with a nut 14 and at the other with annular flanges 5 and 7 to form an intermediate groove 6, in which a soft-rubber washer 12 is fitted. Formed along the length of the axle 1 is an oil-groove 3, which leads to an opening through the flange 5 and a recess 9, formed in the second flange 7. An annular oil-groove 2 is formed about the journal, having branches 4 leading therefrom. The box 11 of the axle is of ordinary construction, except that it is formed with oil-ducts 13, extending in the direction of its length, and is fitted at each end with washers 15.

To lubricate the journal 1, it is only necessary to introduce the pointed nozzle 16 of an oil-can beneath the soft-rubber washer 12, as shown at Fig. 3 of the drawings, and when the several grooves 3 4, &c., are filled the said nozzle is withdrawn and the oil confined therein by the said soft-rubber washer 12.

By this construction and arrangement the journal is kept free from dust and the box 11 rendered oil-tight.

Various slight modifications and changes may be made in the general details of construction without departing from the spirit of the invention. Therefore I do not confine myself to that shown and described.

Having thus described my invention, what I claim, and desire to secure by Letters Patent, is—

The herein-described lubricating device for axles and other journals, consisting of the journal 1, provided with the oil-grooves extending in the direction of its length, and about the same, the annular groove 6, the opening 10 leading to the oil-grooves 3, and the recess 9 arranged opposite, in a manner that will permit the pointed nozzle of an oil-can to be introduced beneath a soft-rubber washer 12 in said annular groove 6, and the box having oil-grooves, substantially as and for the purpose described.

In testimony whereof I have hereunto affixed my signature in the presence of two subscribing witnesses.

JOHN SEITER.

Witnesses:
JOHN GROETZINGER,
M. E. HARRISON.